United States Patent [19]

Gonzalez-Sanz

[11] Patent Number: 5,439,697
[45] Date of Patent: Aug. 8, 1995

[54] LOW-FAT SPREADABLE COMPOSITIONS

[75] Inventor: Juan M. Gonzalez-Sanz, St. Louis, Minn.

[73] Assignee: The Pillsbury Company, Minneapolis, Minn.

[21] Appl. No.: 119,345

[22] Filed: Sep. 9, 1993

[51] Int. Cl.$^6$ .................. A23L 1/0522; A23G 3/00
[52] U.S. Cl. .................. 426/572; 426/578; 426/659
[58] Field of Search .............. 426/572, 578, 658, 661, 426/659

[56] References Cited

U.S. PATENT DOCUMENTS

| | | | |
|---|---|---|---|
| Re. 27,381 | 5/1972 | Little | 99/54 |
| 2,076,036 | 10/1932 | Leo | 99/132 |
| 2,893,990 | 7/1959 | Hass et al. | 260/234 |
| 3,649,302 | 3/1972 | Daggy et al. | 99/139 |
| 4,146,652 | 3/1979 | Kahn et al. | 426/572 |
| 4,238,520 | 12/1980 | Miller et al. | 426/573 |
| 4,244,983 | 1/1981 | Baker | 426/582 |
| 4,312,891 | 1/1982 | Eisfeldt | 426/573 |
| 4,324,804 | 4/1982 | Davis | 426/36 |
| 4,379,175 | 4/1983 | Baker | 426/582 |
| 4,379,176 | 4/1983 | Scherwitz et al. | 426/613 |
| 4,465,702 | 8/1984 | Eastman et al. | 426/578 |
| 4,479,973 | 10/1984 | Holley | 426/573 |
| 4,492,714 | 1/1985 | Cooper et al. | 426/602 |
| 4,724,152 | 2/1988 | Baker et al. | 426/335 |
| 4,761,292 | 8/1988 | Augustine et al. | 426/572 |
| 4,844,922 | 4/1989 | Uemura et al. | 426/104 |
| 4,940,601 | 7/1990 | Orphanos et al. | 426/601 |
| 5,051,271 | 9/1991 | Iyengar et al. | 426/658 |
| 5,079,024 | 1/1992 | Crane | 426/573 |
| 5,102,680 | 4/1992 | Glass et al. | 426/572 |
| 5,108,773 | 4/1992 | Smith et al. | 426/582 |
| 5,154,942 | 10/1992 | Hirschey et al. | 426/572 |
| 5,158,798 | 10/1992 | Fung et al. | 426/572 |
| 5,180,604 | 1/1993 | Crane et al. | 426/582 |
| 5,230,918 | 7/1993 | Anderson et al. | 426/572 |

FOREIGN PATENT DOCUMENTS

12170239 9/1973 France .
WO94/04037 3/1994 WIPO .

OTHER PUBLICATIONS

Wheat Chemistry & Technology, 2nd Ed., vol. III, Y. Pomeranz, 1971.

*Primary Examiner*—Jeanette Hunter
*Attorney, Agent, or Firm*—Merchant, Gould, Smith, Edell, Welter & Schmidt

[57] ABSTRACT

The invention is a low fat spreadable composition such as a frosting for use alone or with any type of comestible baked goods including cakes, rolls, breads, biscuits, pastries and the like. The composition of the invention generally comprises a combination of hydrophilic starch, hydrophobic starch and hydrocolloids, as well as sweeteners, emulsifiers, shortening, and water. The composition of the invention has enhanced adhesion to and provides reduced dryness in baked food products.

13 Claims, No Drawings

LOW-FAT SPREADABLE COMPOSITIONS

FIELD OF THE INVENTION

The invention generally relates to low-fat spreadable compositions. More specifically, the invention relates to low-fat frosting compositions that provide increased adhesion and reduced dryness in baked food products.

BACKGROUND OF THE INVENTION

Various compositions and processes for reducing fat content in foods have been developed within the food products industry. One method for reducing fat content in foods includes the use of modified starches as fat substitutes. For example, Iyengar et al., U.S. Pat. No. 5,051,271, disclose a method for preparing a food grade insoluble starch bulking agent, wherein the starch is chemically modified by enzymatic hydrolysis. This starch-based bulking agent can be used as a fat substitute in food products.

Another fat reducing process involves combining starch and a gelling agent. For example, Uemura et al., U.S. Pat. No. 4,844,922, disclose low-fat foods wherein a gel, comprising a gelling agent such as pectin and a thickening agent such as starch, is used as a fat substitute.

These compositions and processes for reducing fat in foods have been used to prepare low-fat spreadable food products. For example, Hirschey et al., U.S. Pat. No. 5,154,942 disclose aerated reduced-fat cremes comprising pregelatinized, chemically modified instant starch. Miller et al, U.S. Pat. No. 4,238,520, disclose low-fat comestible spreads comprising pectin or starch and starch derivatives.

Further, Glass et al., U.S. Pat. No. 5,102,680, disclose a reduced fat frosting composition comprising a gelling component which includes a pregelatinized, chemically modified, cold water swellable starch.

However, the development of fat substitutes and low-fat food compositions, combined with consumer preferences for healthier food products, has created a variety of problems. For example, low-fat compositions previously produced as "ready-to-spread" have tended to provide poor performance stability. As used herein, "ready-to-spread" refers to products that can be directly applied from the container to a desired food by the consumer without the requirement of additional preparation steps prior to the application.

Attempts have been made to stabilize ready-to-spread compositions that are not considered "low-fat". For example, Daggy et al., U.S. Pat. No. 3,649,302, disclose a process for producing a shelf-stable ready-to-spread frosting composition comprising a chemically modified, cold water swellable starch. Augustine et al., U.S. Pat. No. 4,761,292, disclose a shelf-stable ready-to-spread frosting composition comprising both chemically and physically modified starches that are cold water swellable. Although these products showed improved shelf-stability, their product performance stability, i.e. stability on the food product to which the ready-to-spread frosting was applied, was not determined.

Currently available low-fat ready-to-spread frostings tend to be unable to remain on the cake for more than a few hours after application. The rate of occurrence of the phenomenon usually described by consumers as "watery", "mushy" or "soft" is accelerated at cake storage temperatures at or above room temperature. Hence, the performance of currently available low-fat ready-to-spread frostings does not meet consumer expectations with regard to stability.

There is, therefore, a recognized need for low-fat compositions which are readily spreadable and maintain the moistness of baked products to which they are applied, and are stable once they are placed on the baked good for extended periods of time.

SUMMARY OF THE INVENTION

In accordance with a first aspect of the invention, there is provided a spreadable composition comprising sweeteners, starch, hydrocolloids and water, as well as food products comprising this composition.

In accordance with an additional aspect of the invention, there is provided a process for preparing a low-fat ready-to-spread composition comprising sweeteners, starch, hydrocolloids and water. The process comprises the steps of hydrating a hydrophilic starch constituent, preparing a slurry comprising hydrocolloids and sucrose, combining the slurry with the hydrated hydrophilic starch constituent, adding an emulsifying agent to the combination, and stabilizing the combination prior to the addition of a hydrophobic starch constituent and shortening.

In its most preferred mode, this invention relates to reduced fat, ready-to-spread frosting compositions which have greater on-cake stability qualities.

The nature of the fat substitutes in reduced fat ready-to-spread frosting compositions causes the frostings to become more hydrophilic. The hydrophilic nature of the "lower fat" frostings, in turn, leads to a variance in water activity ($A_w$) which may result in the physical instability of frostings and dryness in the baked product.

The difference in $A_w$ between the frosting and baked product combined with the hydrophilic nature of the frosting leads to an osmotic transfer of moisture from the baked product to the frosting. Thus, the osmotic migration of moisture from the baked product to, and through, the frosting leads in many instances to a dry baked good with a frosting coating which has partially, if not fully, disintegrated.

We have discovered that the runniness of low-fat frostings is caused by the formation of a thin, high moisture, low viscosity film located at the frosting-cake interface. This "runny" film is formed as a result of moisture migration from the cake to the low-fat frosting. The water causes a dilution of solids on the frosting-cake interfacial layer, thus leading to a reduction in viscosity and yield value in the material, and also inducing a reduction in frosting adhesiveness to the baked good.

The low-fat ready-to-spread composition of the present invention does not tend to become runny and slide off the cake after being applied and stored for regular periods of time (24–48 hours) at or above room temperature.

DETAILED DESCRIPTION OF THE PREFERRED EMBODIMENTS

The invention generally comprises spreadable compositions such as a frosting composition, mayonnaise, mousse and sauces with reduced fat content for use alone or with a variety of food products including cakes, rolls, breads, biscuits, pastries and the like. Within the context of the invention, "spreadable" refers to a material which deforms when a stress is applied to it and which can be applied in a layer onto a surface.

The viscosities of the compositions were measured at room temperature using a Brookfield Viscometer, model RVT with a helio-path stand. A T-Bar-(F) spindle was utilized at 10 RPM during the viscosity measurements.

Typically, the viscosity of the spreadable composition of the present invention is about 15 to 90 cps. Preferably, the viscosity is about 20 to 70 cps, more preferably about 20 to 35 cps.

The spreadable composition of the invention generally comprises a combination of cracked starch, hydrophobic starch and hydrocolloids, as well as sweetening agents, emulsifiers, shortening, and water. The frosting of the invention has enhanced adhesion and provides reduced moisture loss in baked products.

The Composition

A. Sweeteners

The primary constituent of the spreadable composition comprises sweeteners. One role of sweeteners in food is to provide taste. Sweeteners are generally classified as either intense sweeteners or bulk sweeteners. Intense sweeteners include sweeteners such as aspartame, saccharine and cyclamates. Bulk sweeteners comprise sweeteners which are generally categorized as "sugar". These bulk sweeteners are the preferred sweeteners of the present invention.

Bulk sweeteners include mono-, di-, and other oligosaccharides such as glucose, fructose, galactose, sorbitol, mannitol, maltose, sucrose, and lactose, among others. These sweeteners can be derived from a variety of liquid and solid forms, such as cane sugar, beet sugar, molasses, maple syrup, honey, corn syrup and corn syrup solids.

The sweeteners function primarily as bulking agents, providing sweet taste, moistness and viscosity. In addition, sweeteners function to control water activity and density of the spreadable composition.

The preferred sweeteners used in the present invention comprise glucose, sucrose, fructose, maltose, corn syrup and mixtures thereof. Preferably, a mixture of sucrose and corn syrup is used. The concentration of sweetener ranges from about 30 wt-% to 90 wt-%.

The sucrose concentration in the spreadable composition ranges from about 28 to about 88 wt-%, preferably from about 47 to about 82 wt-% and more preferably from about 62 to about 66 wt-%.

The corn syrup in the spreadable composition ranges from about 2 to about 16 wt-%, preferably from about 6 to about 12 wt-%. An example of a corn syrup that can be used in the present invention is Amaizo 43/42 ™, manufactured by American Maize Co. of Hammond, IN.

B. Shortening

Another component in the spreadable composition of the present invention is shortening. Shortening comprises fats, oils, and other lipid-containing materials. Fats and oils commonly used in food include glycerol esters of fatty acids, known as triglycerides or triacylglycerols, and products derived therefrom.

The shortening in the present invention can be obtained from a variety of sources including animal and vegetable sources. Preferably used are shortenings derived from vegetable oils such as corn, soybean, peanut, cottonseed, sesame, sunflower, rapeseed, olive, coconut, palm and other oils.

Generally, the shortening used in this invention provides body and mouthfeel to the composition, as well as carrying flavors, retaining moisture and tenderizing the composition. In addition, the shortening functions to control product density by aiding in the incorporation and retention of gas.

Shortenings are commercially available in a form preblended with emulsifiers to assist incorporation of the shortening into food systems. Preferably, an emulsified shortening is used in the spreadable composition.

The preferred emulsified shortening used in this invention comprises partially hydrogenated soybean and cottonseed oils combined with emulsifiers such as a mixture of monoglycerides of higher fatty acids. A preferred emulsified shortening comprises from about 95 to about 99 wt-% of shortening and from about 1 to about 5 wt-% of emulsifier. One type of preferred emulsified shortening is available from Bunge Foods, Inc. of Bradley, IL.

Shortenings are usually classified according to their solid-fat-index (SFI). The SFI relates to the proportion of material that remains solid in the shortening at a specific temperature. The preferable SFI profile of the shortening used in this invention is:

| Temperature, °F. (°C.) | SFI |
|---|---|
| 50° (10.0°) | 29.0–33.0% |
| 70° (21.1°) | 21.5–25.5% |
| 80° (26.7°) | 20.0–24.5% |
| 92° (33.3°) | 15.0–20.0% |
| 104° (40.0°) | 8.0–12.0% |

The concentration of shortening in the frosting composition described in this invention ranges from about 1 to about 9 wt-% and preferably from about 3 to about 9 wt-%.

C. Starch

One of the fat replacing constituents of the spreadable composition is starch. Starch is a mixture of linear and branched polymers of D-glucopyranosyl units having the formula $(C_6H_{10}O_5)_n$. Starch occurs in a granular form in many plants such as wheat, corn, rice and potatoes. Natural starch which has not gone through any physical or chemical degradation tends to be generally insoluble in cold water, but might imbibe water reversibly and swell slightly. When hot water is added to this type of starch granule, the granules swell irreversibly and form a gel.

Common starches contain two types of D-glucopyranose polymers, amylose and amylopectin. Amylose is a linear polymer of D-glucopyranosyl units linked $\alpha(1\rightarrow 4)$. Amylopectin is a highly branched polymer of $\alpha(1\rightarrow 4)$ D-glucopyranosyl units with $\alpha(1\rightarrow 6)$ linkages at the branch points.

In the context of the invention, starch functions primarily by replacing or extending the fat within the spreadable composition as well as binding moisture, developing the viscosity of the spreadable composition, and providing the pleasing textural characteristics of mouthfeel and body during consumption.

Generally, any number of starch compounds may be used including those which are unmodified or modified starches. Unmodified starches are natural, intact starch granules. Modified starches include starches which have been chemically modified or physically modified. Chemical modification of starch granules includes, among other processes, acid treatment, oxidation, fermentation, derivatization and crosslinking. Physical modification of starch includes such processes as cracking, pregelatinizing or crystallizing the starch granules.

Modifications to starch granules may affect the water affinity characteristics of the granules. Preferably, the composition of the invention will comprise a hydrophilic starch component as well as a hydrophobic starch component.

The hydrophilic starch component functions to replace fats, build viscosity, bind moisture, and provide the intended mouthfeel and body to the frosting of the invention. Hydrophilic starches which may be used include chemically modified starches, physically modified starches or mixtures thereof.

A preferred hydrophilic starch comprises a corn starch that has been physically modified, such as Optagrade ™ starch manufactured by Opta Food Ingredients, Inc. of Bedford, MA.

The hydrophilic starches may be found in the invention at concentrations ranging from 0.5 to 6 wt-%, more preferably 1 to 4 wt-% and most preferably 1 to 2 wt-%.

The hydrophobic starch component of the composition of the invention is used as a fat extender and as an insoluble constituent within the composition. The hydrophobic starch may be selected from the group comprising chemically modified starches, physically modified starches, or mixtures thereof.

A preferred hydrophobic starch comprises a wheat starch that has been chemically modified through the attachment of hydrophobic chains to the surface of the starch granule. Examples of preferred chemically modified wheat starches include Repel S ™ and Repel A ™ starches manufactured by Midwest Grain Products, Inc., of Atchinson, KS.

The concentration of the hydrophobic starch component within the spreadable composition of the invention ranges from about 0.25 to 4 wt-%, preferably 0. 5 to 3 wt-%, and most preferably from about 1 to 2 wt-%.

D. Hydrocolloid

The composition of the invention also comprises hydrocolloids. Hydrocolloids, also referred to as gums, are usually high molecular weight, hydrophilic compounds that disperse in water as colloids.

Hydrocolloids used in foods can be of vegetable, animal, or microbial origin. Gelatin, casein, and whey proteins are the hydrocolloids of animal origin most commonly used in foods. Dextran, xanthan and gellan gums are the only microbial hydrocolloids currently approved for food use. Vegetable hydrocolloids can be extracted from seeds, plant exudates, fruits, and seaweeds. Examples of vegetable gums are locust, tamarind, guar, arabic, ghatti, karaya, tragacanth, agar, furcellaran, alginates, carragenans, pectins, and celluloses. These hydrocolloids can be used in their natural form or modified to tailor their properties to particular applications.

The hydrocolloid used in the invention functions to bind water and provide viscosity, which builds plasticity, stabilizes the emulsion and provides pleasing textural qualities such as mouthfeel. Preferably, the hydrocolloid used in the present invention comprises pectin or other pectic substances.

The pectin preferably used within the spreadable composition of the invention comprises a blend of low methoxylated pectin and sucrose, such as Pectin LM20AS ™, manufactured by Hercules, Inc., of Naperville, IL. A pectin/sucrose blend is preferred as sucrose facilitates the hydration of pectin.

The concentration of the pectin/sucrose blend may range from about 0.05 to 1.5 wt-%, preferably from about 0.2 to 0.5 wt-% as a percentage of the spreadable composition.

E. Emulsifiers

Another component of the spreadable composition comprises emulsifiers. Emulsifiers are substances that facilitate the formation and stabilization of an emulsion. An emulsion can be defined as a system formed by the dispersion of two or more immiscible liquids.

The emulsifier used in this invention functions as a stabilizer of the emulsion between the aqueous and the lipid phase, enhances eating quality by improving the smoothness, uniformity, and consistency of the frosting, aids in controlling product density by assisting in the incorporation and retention of gas, increases viscosity, and provides freeze-thaw stability.

The emulsifier used in the spreadable composition described herein comprises mono- and di-glycerol esters of fatty acids, sucrose esters of fatty acids, sorbitan esters of fatty acids, tetraglycerol monostearate, propylene glycol monostearate, succinic acid esters or diacetyl tartaric esters of monoglycerides, sodium stearoyl-2-lactylate, lecithin, or mixtures thereof. The preferred emulsifiers used in this composition include lecithin and sucrose esters of fatty acids, among others. An example of a lecithin emulsifier suitable for use in this invention is Centrobake 100L ™, manufactured by Central Soya Inc. of Fort Wayne, IN. An example of an esterified fatty acid emulsifier that can be used in the spreadable composition is Celynol MSPO11 ™, available from Rhone-Poulenc, Inc. of Cranbury, NJ.

The concentration of emulsifier in the spreadable composition described in this invention ranges from about 0.25 to about 3 wt-% and preferably from about 0.50 to about wt-%.

F. Water

The water present in the spreadable composition functions as a solvent for the non-fat ingredients such as starch and hydrocolloids. The moisture content of the frosting formulation is related to moistness, tenderness, and acts as the continuous phase in emulsification of the shortening. Water also aids in the processability of the formula by affecting flow properties such as viscosity.

The water content of the spreadable composition of the invention is in the range of from about 9 to about 27 wt-%, preferably from about 11 to about 19 wt-%.

E. Adjuvants

The low-fat spreadable composition of the present invention can optionally comprise a variety of adjuvant materials to modify the organoleptic and nutritional properties of the composition. In particular, the compositions can additionally include fat replacers, sugar replacers or bulking agents. Additionally, synthetic and natural flavorings or coloring agents can be used in the compositions of the present invention. Typical flavors include cream or cream cheese flavor, milk powder, chocolate, vanilla extract, vanilla powder, cocoa, cocoa substitute, hazelnut, mint, lemon and mixtures thereof. Also, flavoring materials and particulates, such as fruit, fruit extracts, nuts, chips and the like, can be added to the compositions as desired.

Other additives can be present in compositions in minor amounts, less than about 1%, preferably less than about 0.5%, if desired. Generally, they include salt, whiteners, sequestering agents, acidulants, buffers, food acids, preservatives, antioxidants, and mixtures thereof.

EXAMPLES

Low-fat ready-to-spread frosting compositions were prepared using the formulations set forth in Table I.

TABLE I

| INGREDIENTS | VANILLA LOW-FAT RTS FROSTING (Wt-%) | CHOCOLATE LOW-FAT RTS FROSTING (Wt-%) |
| --- | --- | --- |
| Sucrose, fine | 63.78 | 65.10 |
| Water, distilled | 15.30 | 16.00 |
| Corn syrup | 7.50 | 3.00 |
| Shortening, emulsified | 7.00 | 7.00 |
| Cocoa powder | — | 5.00 |
| Hydrophilic Starch | 2.00 | 1.30 |
| Hydrophobic Starch | 2.00 | 1.00 |
| Pectin | 0.70 | 0.20 |
| Emulsifier | 0.50 | 0.40 |
| Salt | 0.50 | 0.60 |
| Flavorings | 0.30 | 0.06 |
| Titanium dioxide | 0.27 | — |
| Potassium sorbate | 0.10 | 0.10 |
| Color | 0.03 | — |
| Citric acid | 0.02 | 0.24 |

The frosting compositions were prepared by forming a pectin slurry by mixing pectin with water at a 1:5 ratio at room temperature using mild agitation. The balance of the water was separately heated to approximately 170° F. to about 212° F. A starch slurry was prepared in a separate container by mixing the hydrophilic starch with the heated water under continuous agitation. The starch slurry was mixed until a smooth, bland, opaque, flowable, starch-based cream was formed.

The starch and pectin slurries were combined under constant agitation at a temperature of approximately 114° to 120° F. (45.5° to 48.9° C.).

Solid and liquid ingredients present in about 0.75 wt-% or less in the formulation, such as emulsifier, salt, flavorings, titanium dioxide, potassium sorbate, color, and citric acid, were added to the starch/pectin slurry using mild agitation until uniformly blended.

The corn syrup was incorporated into the mixture, followed by the sucrose and the hydrophobic starch. The mixture was subjected to mild agitation until all ingredients were uniformly blended.

The emulsified shortening, previously melted and kept at a temperature of 125° to 145° F. (51.6° to 62.8° C.), was gradually added to the mixture under agitation.

The mixture was continuously mixed and kept at approximately 114° to 120° F. (45.5° to 48.9° C.) while nitrogen gas was forced through it to control product density. The frosting composition was then cooled to a temperature of about 75° F. (23.8° C.) and packaged. The final frosting density is preferably in the range of from about 0.85 to about 1.20 g/cc.

The resulting low-fat ready-to-spread frosting composition has superior organoleptic and performance stability qualities. The frosting remained on cakes which were stored for periods of time greater than about 24 hours at temperatures above about 85° F. Furthermore, during the storage periods, the frosting retained its pleasing appearance, flavor and texture.

While preferred embodiments of the present invention have been described, it should be understood that various changes, adaptations and modifications may be made without departing from the spirit and scope of the invention as defined by the appended claims.

We claim as our invention:

1. A low-fat ready-to-spread composition comprising:
    (a) a sweetener in an amount of from about 30 wt % to about 90 wt % relative to the total weight of the composition;
    (b) a shortening in an amount of from about 1 wt % to about 9 wt % relative to the total weight of the composition;
    (c) a starch in an amount of from about 0.75 wt % to about 10 wt % relative to the total weight of the composition, said starch having a hydrophilic starch component and a modified hydrophobic starch component;
    (d) a hydrocolloid in an amount of from about 0.05 wt % to about 1.5 wt % relative to the total weight of the composition;
    (e) an emulsifier in an amount of from about 0.25 wt % to about 3 wt % relative to the total weight of the composition; and
    (f) water in an amount of from about 9 wt % to about 27 wt % relative to the total weight of the composition.

2. The composition of claim 1, wherein said hydrophilic starch component is present in a concentration ranging from about 0.5% to about 6% by weight of the composition and said hydrophobic starch component is present in a concentration ranging from about 0.25% to about 4% by weight of the composition.

3. The composition of claim 1 wherein said starch comprises a compound selected from the group consisting of chemically modified starches, physically modified starches, natural starches or mixtures thereof.

4. The composition of claim 1, wherein the sweetener constituent is present in the composition in a concentration ranging from about 47% to about 82% by weight of the composition.

5. The composition of claim 1 wherein said hydrocolloid comprises pectin present in the composition at a concentration ranging from about 0.05 to 1.5% by weight.

6. A food product comprising the composition of claim 1.

7. A frosting composition comprising:
    (a) a starch in an amount of from about 1 wt % to about 6 wt % relative to the total weight of the composition, wherein said starch has a hydrophilic starch component and a modified hydrophobic starch component;
    (b) a hydrocolloid in an amount of from about 0.1 wt % to about 0.8 wt % relative to the total weight of the composition;

(c) a sweetener in an amount of from about 68 wt % to about 78 wt % relative to the total weight of the composition;

(d) a shortening in an amount of from about 3 wt % to about 9 wt % relative to the total weight of the composition;

(e) an emulsifier in an amount of from about 0.5 wt % to about 3 wt % relative to the total weight of the composition; and (f) water in an amount of from about 11 wt % to about 19 wt % relative to the total weight of the composition.

8. The composition of claim 7, wherein said starch comprises a hydrophilic starch component present in a concentration ranging from about 1% to 4% by weight of the composition and a hydrophobic starch component present in a concentration ranging from about 0.5% to 3% by weight of the composition.

9. The composition of claim 7 wherein said hydrocolloid comprises pectin.

10. A food product comprising the frosting composition of claim 7.

11. A process for preparing a low-fat frosting composition comprising starch, a hydrocolloid, sweeteners, shortening, an emulsifier, and water; said starch comprising a hydrophilic component and a hydrophobic component, said method comprising the steps of:

(a) preparing a starch slurry by hydrating said hydrophilic starch component;

(b) preparing a hydrocolloid slurry by mixing said hydrocolloid with water at a ratio of about 1:5;

(c) combining the hydrocolloid slurry with said hydrated starch slurry;

(d) adding said emulsifiers to the hydrocolloid slurry and starch slurry combination; and (e) mixing said hydrophobic starch component, sweeteners and shortening with the slurry and emulsifier combination;

wherein the low-fat frosting composition has a final density of from about 0.85 to about 1.20 g/cc.

12. The frosting composition resulting from the process of claim 11.

13. The frosting composition of claim 12 wherein said composition comprises shortening in about 5 to 8% by weight of the composition.

* * * * *